United States Patent
Murata et al.

(10) Patent No.: US 10,060,477 B2
(45) Date of Patent: Aug. 28, 2018

(54) TAPERED ROLLER BEARING AND POWER TRANSMISSION DEVICE

(71) Applicant: JTEKT CORPORATION, Osaka-shi, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/803,095

(22) Filed: Nov. 3, 2017

(65) Prior Publication Data

US 2018/0128316 A1 May 10, 2018

(30) Foreign Application Priority Data

Nov. 10, 2016 (JP) .................. 2016-219768

(51) Int. Cl.
*F16C 33/58* (2006.01)
*F16C 19/36* (2006.01)
*F16C 19/22* (2006.01)

(52) U.S. Cl.
CPC .......... *F16C 33/585* (2013.01); *F16C 19/225* (2013.01); *F16C 19/364* (2013.01); *F16C 2326/06* (2013.01)

(58) Field of Classification Search
CPC ........ F16C 19/34; F16C 19/36; F16C 19/364; F16C 19/383–19/388; F16C 33/36; F16C 33/363; F16C 33/366; F16C 33/58; F16C 33/583; F16C 33/585; F16C 2240/50; F16C 2326/06
See application file for complete search history.

(56) References Cited

U.S. PATENT DOCUMENTS

| 6,502,996 B2 * | 1/2003 | Joki ...................... F16C 19/364 384/450 |
| 6,530,693 B1 * | 3/2003 | Ijuin ..................... F16C 19/225 384/450 |
| 7,874,737 B2 * | 1/2011 | Matsuyama ............ F16C 33/36 384/450 |
| 2005/0047700 A1 * | 3/2005 | Tsujimoto ............. F16C 19/364 384/571 |
| 2007/0041678 A1 * | 2/2007 | Matsuyama .......... F16C 19/225 384/571 |
| 2015/0167742 A1 | 6/2015 | Murata et al. |

(Continued)

FOREIGN PATENT DOCUMENTS

| JP | H05-75520 U | 10/1993 | |
| JP | 2002147461 A | * 5/2002 | ............ F16C 19/225 |

*Primary Examiner* — Alan B Waits
(74) *Attorney, Agent, or Firm* — Oliff PLC

(57) ABSTRACT

A tapered roller bearing includes an inner ring with a large rib, an outer ring, and multiple tapered rollers. Each of the tapered rollers has, at its axial end, a large end face that is a convex surface. The large rib has a rib face that is a concave surface and that is in contact with the large end face. When a distance from a position of contact between the large end face and the rib face to a cone center of the corresponding tapered roller is defined as R, a curvature radius of the large end face is defined as Rr, and a curvature radius of the rib face is defined as Ri, an inequality represented by $2 \leq (Ri-R)/(R-Rr) \leq 10$ is satisfied, where $Rr < R < Ri$.

4 Claims, 5 Drawing Sheets

(56) References Cited

U.S. PATENT DOCUMENTS

| | | | |
|---|---|---|---|
| 2015/0198202 A1* | 7/2015 | Murata | F16C 33/366 384/571 |
| 2016/0040718 A1* | 2/2016 | Murata | F16C 33/366 384/564 |
| 2018/0128316 A1* | 5/2018 | Murata | F16C 33/585 |

* cited by examiner

US 10,060,477 B2

TAPERED ROLLER BEARING AND POWER TRANSMISSION DEVICE

INCORPORATION BY REFERENCE

The disclosure of Japanese Patent Application No. 2016-219768 filed on Nov. 10, 2016 including the specification, drawings and abstract, is incorporated herein by reference in its entirety.

BACKGROUND OF THE INVENTION

1. Field of the Invention

The invention relates to a tapered roller bearing and a power transmission device.

2. Description of the Related Art

Tapered roller bearings have a large load capacity and high rigidity, as compared to other types of rolling bearings of the same size, and are therefore widely used. In one example, tapered roller bearings are used in drive transmission devices such as a transmission and differential of a vehicle.

FIG. 5 is a cross-sectional view of a tapered roller bearing according to the related art. This tapered roller bearing includes an inner ring 101, an outer ring 102, multiple tapered rollers 103, and an annular cage 104. The tapered rollers 103 are provided between the inner ring 101 and the outer ring 102. The cage 104 holds the tapered rollers 103. When the tapered roller bearing rotates, a large end face 105 of each of the tapered rollers 103 is in sliding contact with a cone back face rib (hereinafter referred to as a large rib) 109 of the inner ring 101. To reduce a sliding frictional resistance between the large end face 105 and a rib face (a side surface) 108 of the large rib 109, the large end face 105 is a convex surface whereas the rib face 108 is a concave surface (refer to, for example, Japanese Unexamined Utility Model Application Publication No. H5-75520).

However, for the large end face 105 of the tapered roller 103 and the rib face 108 of the large rib 109, there are still no specific guidelines on what length the radius of curvature thereof should be set to. Thus, the amount of reduction in the sliding frictional resistance may be insufficient depending on what length the radius of curvature is set to.

The sliding frictional resistance changes depending largely on not only a contact surface pressure exerted between the large end face 105 and the rib face 108, but also the thickness of an oil film formed between the large end face 105 and the rib face 108. Specifically, as the contact surface pressure decreases and as the oil film thickness increases, the sliding frictional resistance decreases.

SUMMARY OF THE INVENTION

A purpose of the invention is to reduce a contact surface pressure exerted between a large rib of an inner ring and a tapered roller in a tapered roller bearing while increasing the thickness of an oil film formed between the large rib and the tapered roller.

An aspect of the invention provides a tapered roller bearing including the following: an inner ring that has an outer circumferential surface provided with an inner raceway and that has a large rib projecting radially outward from an axial end of the inner raceway; an outer ring having an inner circumferential surface provided with an outer raceway; multiple tapered rollers in rolling contact with the inner raceway and the outer raceway; and an annular cage that holds the multiple tapered rollers. Each of the tapered rollers has, at its axial end, a large end face that is a convex surface. The large rib has a rib face that is a concave surface and that is in contact with the large end face. When a distance from a position of contact between the large end face and the rib face to a cone center of a corresponding one of the tapered rollers is defined as R, a curvature radius of the large end face is defined as Rr, and a curvature radius of the rib face is defined as Ri, an inequality represented by $2 \leq (Ri-R)/(R-Rr) \leq 10$ is satisfied, where $Rr < R < Ri$.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
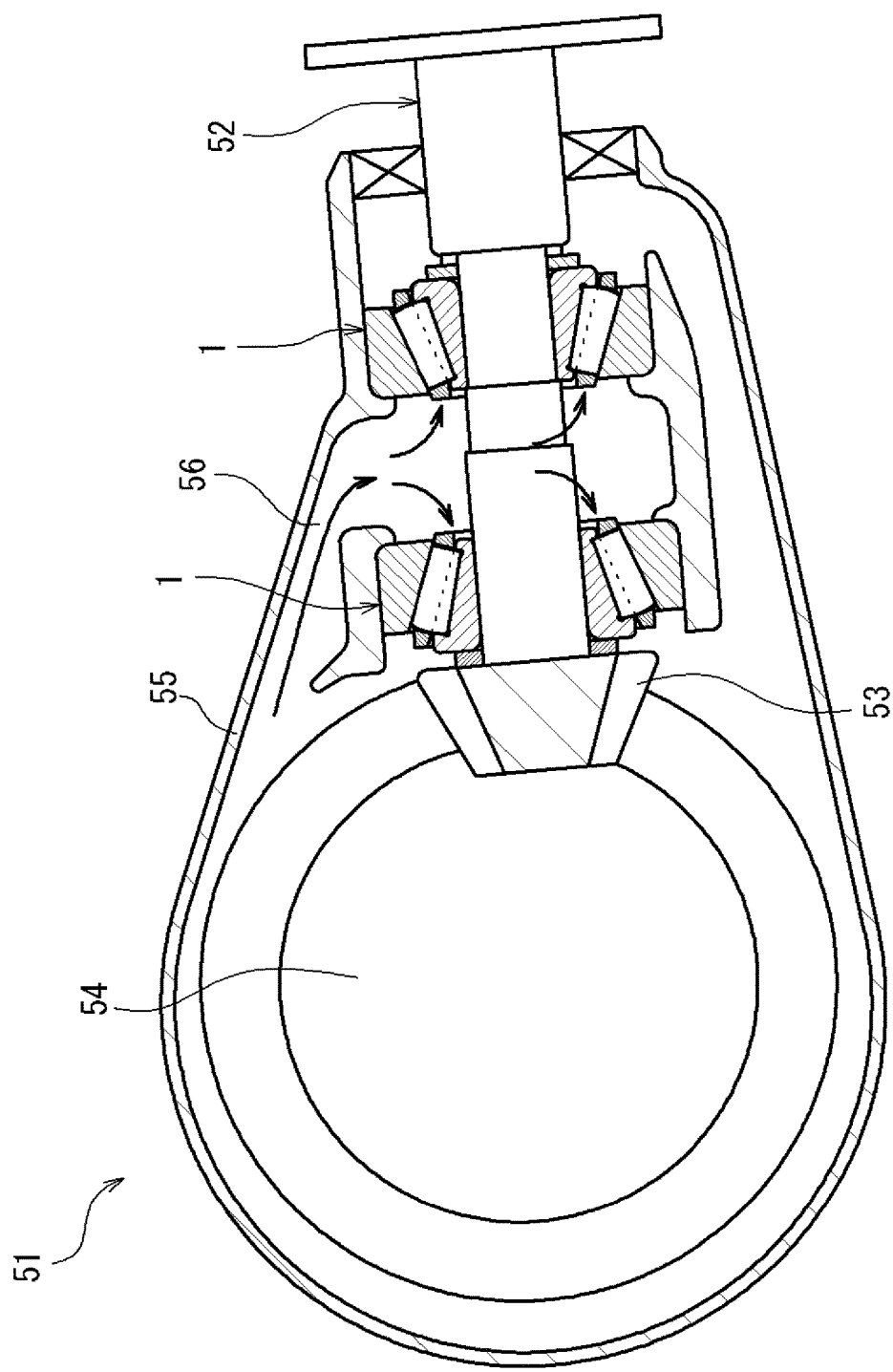
FIG. 1 is a cross-sectional view of a differential device including a pair of tapered roller bearings according to an embodiment of the invention.

Below, an embodiment of the invention is described with reference to the drawings. FIG. 1 is a cross-sectional view of a differential device 51 having a pair of tapered roller bearings according to the embodiment of the invention. The differential device 51 is mounted in a power transmission path that transmits the output of a vehicle engine. The differential device 51 transmits the output of the engine to drive shafts (not illustrated) located to both sides (both sides in the direction perpendicular to the plane of the paper including FIG. 1) of the differential device 51.

The differential device 51 includes a pinion shaft (a power transmission shaft) 52, a pinion gear 53, a differential gear mechanism 54, and a housing 55 that houses the pinion shaft 52, the pinion gear 53, and the differential gear mechanism 54. The pinion shaft 52 rotates along with a propeller shaft (not illustrated) that transmits the output of the engine. The pinion gear 53 is provided at an end of the pinion shaft 52. The differential gear mechanism 54 operates with rotation of the pinion gear 53. The pinion shaft 52 is rotatably supported by a pair of tapered roller bearings 1 inside the housing 55. The housing 55 has a lubricating oil supply passage 56. The lubricating oil supply passage 56 guides the flow of lubricating oil as indicated by arrows in FIG. 1, thus supplying the lubricating oil to the pair of tapered roller bearings 1. The tapered roller bearings 1 are lubricated with the supplied lubricating oil.

Figure 2:
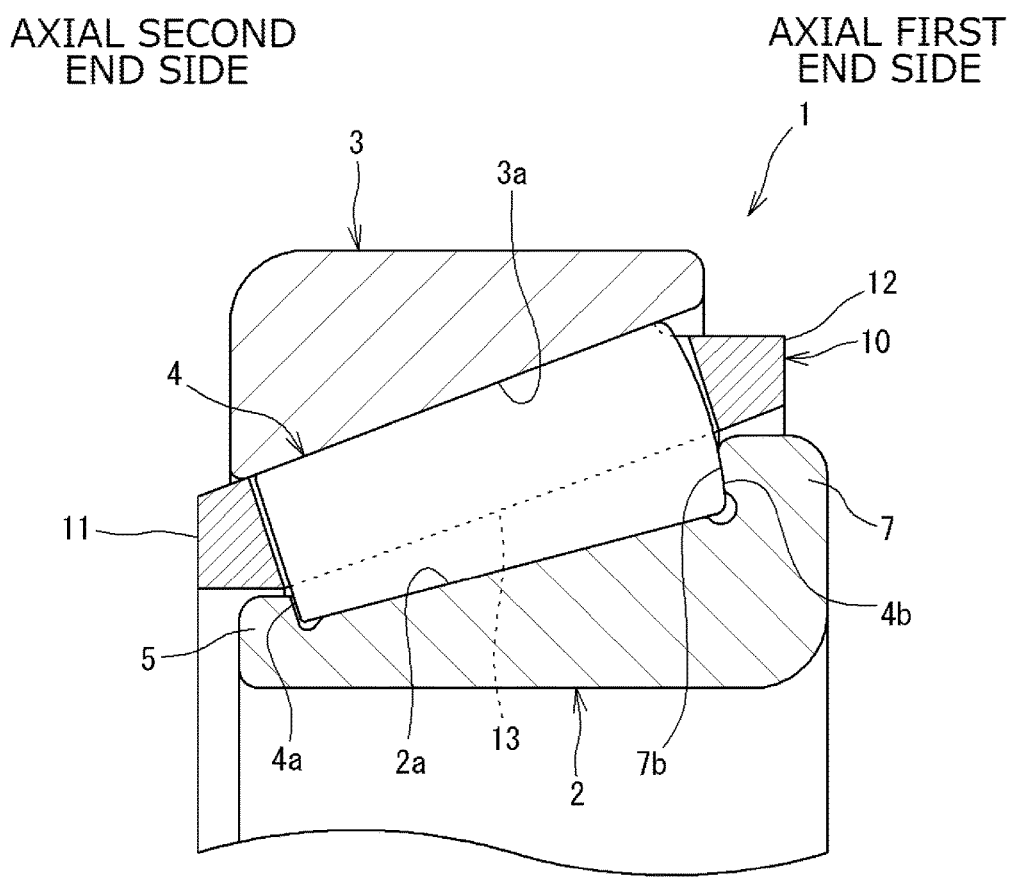
FIG. 2 is a cross-sectional view of the tapered roller bearing.

FIG. 2 is a cross-sectional view of each of the tapered roller bearings 1. The tapered roller bearing 1 includes an inner ring 2, an outer ring 3, multiple tapered rollers 4, and a cage 10. The tapered rollers 4 are provided between the inner ring 2 and the outer ring 3. The cage 10 holds the tapered rollers 4 such that the tapered rollers 4 are circumferentially arranged at predetermined intervals.

The inner ring 2 is an annular member and is made of bearing steel, steel for machine structural use, or other suitable material. The inner ring 2 has an outer circumferential surface provided with an inner raceway 2a. The inner raceway 2a has a conical shape that decreases in diameter in a direction from a first axial end thereof (the right side in FIG. 2) to a second axial end thereof (the left side in FIG. 2) opposite to the first axial end. Like the inner ring 2, the outer ring 3 is an annular member and is made of bearing steel, steel for machine structural use, or other suitable material. The outer ring 3 has an inner circumferential surface provided with an outer raceway 3a. The outer raceway 3a faces the inner raceway 2a and has a conical shape that decreases in diameter in a direction from a first axial end thereof to a second axial end thereof opposite to the first axial end.

Each of the tapered rollers 4 is made of bearing steel or other suitable material and is interposed between the inner ring 2 and the outer ring 3. The tapered rollers 4 are in rolling contact with the inner raceway 2a and the outer raceway 3a. Each of the tapered rollers 4 is shaped like a truncated cone shape, has a large end face 4b at a first axial end thereof, and a small end face 4a at a second axial end thereof opposite to the first axial end. The small end face 4a is smaller in diameter than the large end face 4b.

The cage 10 has an annular shape as a whole and includes a large annular portion 12, a small annular portion 11, and multiple pillar portions 13. The large annular portion 12 is located closer to the first axial end of the tapered roller 4. The small annular portion 11 is located closer to the second axial end of the tapered roller 4. The pillar portions 13 connect the large annular portion 12 and the small annular portion 11. Each of the tapered rollers 4 is held in a corresponding pocket that is defined between the large annular portion 12 and the small annular portion 11 and between adjacent ones of the pillar portions 13.

Figure 3:
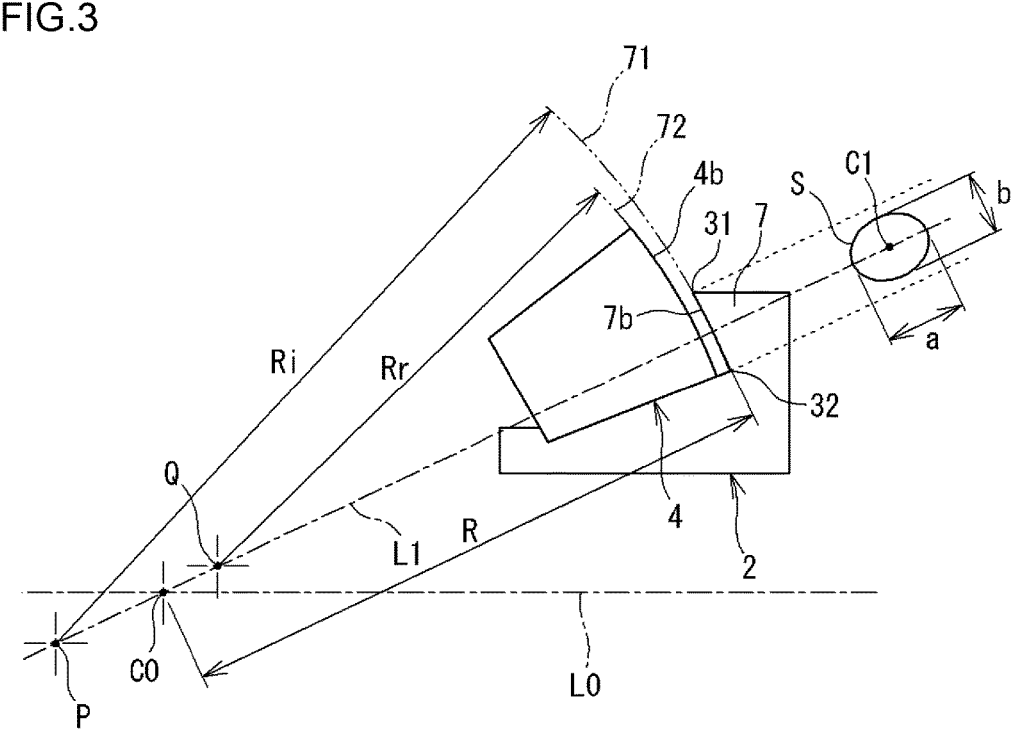
FIG. 3 is a conceptual diagram for explaining the shapes of an inner ring and a tapered roller.

The inner ring 2 has a cone back face rib (hereinafter, referred to as a large rib) 7 that projects radially outward from the first axial end of the inner raceway 2a. The inner ring 2 has a cone front face rib (hereinafter, referred to as a small rib) 5 that projects radially outward from the second axial end of the inner raceway 2a. The large rib 7 has a rib face 7b at a second axial end thereof. The rib face 7b is in contact with the large end face 4b of the tapered roller 4. The rib face 7b is a concave surface. Specifically, as illustrated in FIG. 3, the concave surface of the rib face 7b extends along an imaginary sphere 71 with a center at a predetermined point P. FIG. 3 is a conceptual diagram for explaining the shapes of the inner ring 2 and the tapered roller 4. Although the rib face 7b and the large end face 4b of the tapered roller 4 are actually in contact with each other, they are separated in FIG. 3 for the sake of description. In FIG. 3, Ri represents a curvature radius (a radius) of the imaginary sphere 71, i.e., a curvature radius (a radius) of the rib face 7b. The point P is the center point of the rib face 7b.

As illustrated in FIG. 2, the large end face 4b of the tapered roller 4 is a convex surface and is in contact with the rib face 7b of the large rib 7 of the inner ring 2. When the tapered roller bearing 1 (the inner ring 2 in the embodiment) rotates, the large end face 4b is in sliding contact with the rib face 7b. Specifically, as illustrated in FIG. 3, the convex surface of the large end face 4b extends along an imaginary sphere 72 with a center at a predetermined point Q. In FIG. 3, Rr represents a curvature radius (a radius) of the imaginary sphere 72, i.e., a curvature radius (a radius) of the large end face 4b. The point Q is the center point of the large end face 4b.

As described above, the large end face 4b of the tapered roller 4 is a convex surface, and the rib face 7b of the inner ring 2 is a concave surface. Thus, when the large end face 4b and the rib face 7b are in contact with each other, an elliptical contact area is formed between the large end face 4b and the rib face 7b. The elliptical contact area is hereinafter referred to as a contact ellipse S. In FIG. 3, the contact ellipse S is conceptually illustrated. Actually, the contact ellipse S is formed between the large end face 4b and the rib face 7b. The whole of the contact ellipse S is formed within the rib face 7b. Specifically, in FIG. 3, the contact ellipse S is formed between a radially outer edge 31 and a radially inner edge 32 of the rib face 7b.

As illustrated in FIG. 3, the contact ellipse S has a center C1. The contact ellipse S has a dimension "b" in a direction (a radial direction) from the inner periphery to the outer periphery of the rib face 7b and has a dimension "a" in a direction (a circumferential direction) perpendicular to the radial direction. The contact ellipse S has an ellipticity of "b/a".

The relationship between the curvature radius Ri of the rib face 7b and the curvature radius Rr of the large end face 4b is described below. A distance from a position of contact between the rib face 7b and the large end face 4b to a cone center C0 of the tapered roller 4 is defined here as "R". The cone center C0 is a vertex of a cone (an outside shape) including the tapered roller 4. The position of contact between the rib face 7b and the large end face 4b is at the center C1 of the contact ellipse S. The curvature radius Rr of the large end face 4b is smaller than the distance R (i.e., Rr<R), and the curvature radius Ri of the rib face 7b is larger than the distance R (i.e., Ri >R).

The tapered roller bearing 1 according to the embodiment satisfies the following inequality (1) for the curvature radius Rr, the curvature radius Ri, and the distance R: $2 \leq (Ri-R)/(R-Rr) \leq 10$ . . . (1).

Figure 4:
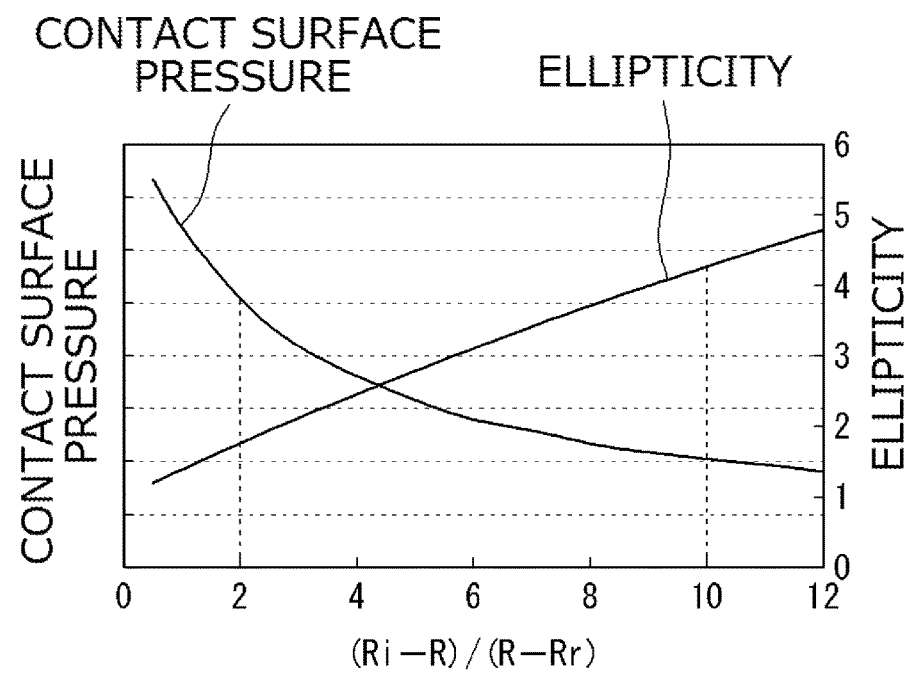
FIG. 4 is a graph showing a result of calculation, where the horizontal axis represents "(Ri−R)/(R−Rr)" and the vertical axes represent "contact surface pressure" and "1/ellipticity"
Figure 5:
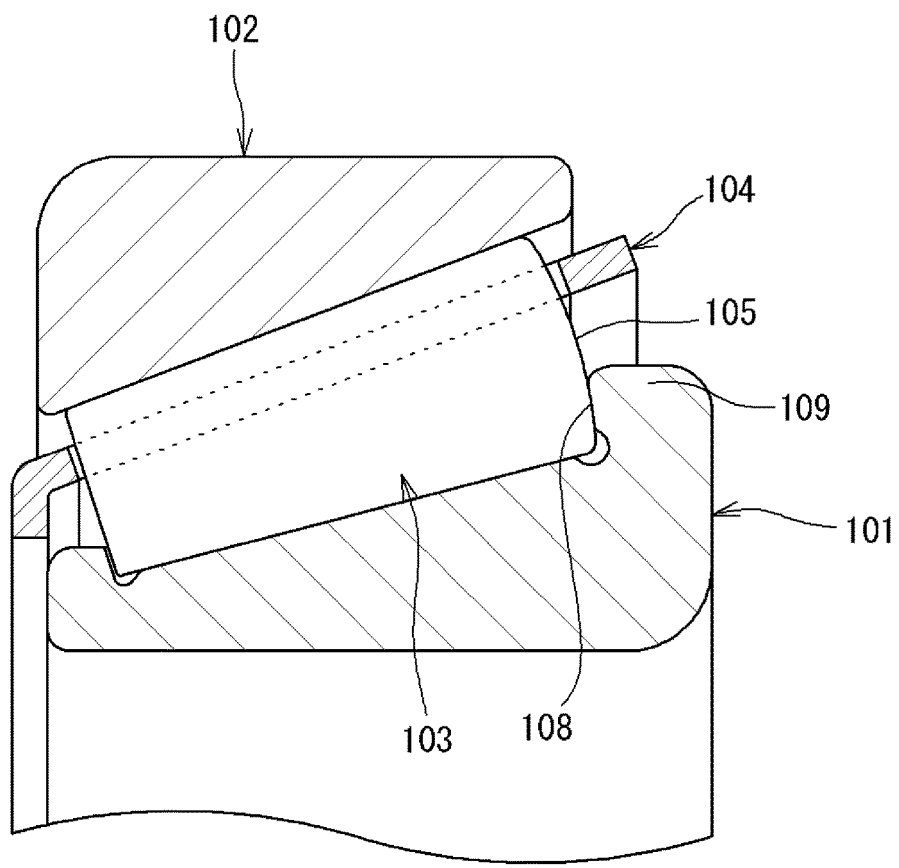
FIG. 5 is a cross-sectional view of a tapered roller bearing according to the related art.

FIG. 4 is a graph showing a result of calculation, where the horizontal axis represents "(Ri–R)/(R–Rr)" in the inequality (1) and the vertical axes represent "contact surface pressure" and "1/ellipticity". The "contact surface pressure" is a contact surface pressure exerted between the rib face 7b and the large end face 4b. The "1/ellipticity" is calculated from the ellipticity of the contact ellipse S. The dimensions a and b used to calculate the contact surface pressure and the ellipticity are calculated by the theory of contact that uses Hertz's formula. Parameters used in this calculation are set as follows: the modulus of longitudinal elasticity of the tapered roller 4 and the inner ring 2 is 207.9 GPa; the Poisson's ratio is 0.3; and the load is axial load equal to 40% of the basic dynamic load rating. In the graph of FIG. 4, the dimension b of the contact ellipse S is constant whereas the dimension a of the contact ellipse S is a variable.

The ellipticity and the contact surface pressure exerted between the rib face 7b and the large end face 4b change with a change in the shape of the contact ellipse S.

The ellipticity and the contact surface pressure affect performance of the tapered roller bearing 1. Specifically, reducing the contact surface pressure reduces or prevents wear between the rib face 7b and the large end face 4b, thus increasing the lifetime of the tapered roller bearing 1. The thickness of an oil film between the rib face 7b and the large end face 4b increases with an increase in the ellipticity (b/a). It is generally known that the thickness of the oil film increases with the increase in the ellipticity (b/a) of the contact ellipse S illustrated in FIG. 3. "R. J. Chittenden, D. Dowson, J. F. Dunn, C. M. Taylor: Proc. R. Soc. Lond, A397(1985)271" is known as a treatise on this.

In FIG. 4, the reciprocal of the ellipticity (1/ellipticity) is used as an indicator. As already described, it is preferable to increase the ellipticity (b/a) because the thickness of the oil film increases accordingly. In the case of the reciprocal of the ellipticity, as the reciprocal of the ellipticity decreases, the thickness of the oil film increases.

As can be seen from FIG. 4, setting the dimension ratio "(Ri−R)/(R−Rr)" in the inequality (1) to be greater than or equal to two reduces the contact surface pressure exerted between the rib face 7b and the large end face 4b. Further, setting the dimension ratio "(Ri−R)/(R−Rr)" to be less than or equal to 10 reduces the reciprocal of the ellipticity (a/b), i.e., increases the ellipticity (b/a), thus increasing the thickness of the oil film formed between the rib face 7b and the large end face 4b. In summary, satisfying the inequality (1) makes it possible to reduce the contact surface pressure exerted between the large rib 7 (the rib face 7b) of the inner ring 2 and the tapered roller 4 (the large end face 4b) while increasing the thickness of the oil film formed between the large rib 7 and the tapered roller 4 in FIG. 2. Thus, the large rib 7 of the inner ring 2 and the tapered rollers 4 are in contact with each other in a preferable manner. This reduces a sliding frictional resistance between the large rib 7 and the tapered roller 4 during rotation of the tapered roller bearing 1. Since the sliding frictional resistance is reduced, the rotational resistance of the tapered roller bearing 1 is reduced accordingly. As such, heat and wear between the large rib 7 and the tapered rollers 4 are reduced or prevented.

The lower limit of the dimension ratio "(Ri−R)/(R−Rr)" may be set to three, instead of two, or preferably may be set to four. The upper limit of the dimension ratio "(Ri−R)/(R−Rr)" may be set to nine, instead of 10, or preferably may be set to eight. The thickness of the oil film formed between the large rib 7 of the inner ring 2 and the tapered roller 4 has more influence on whether the large rib 7 and the tapered roller 4 are in satisfactory contact with each other. From this point of view, it is preferable that the upper limit of the dimension ratio "(Ri−R)/(R−Rr)" be set to six or five. In this case, the dimension ratio "(Ri−R)/(R−Rr)" is not less than two but not greater than six (or five). This allows the oil film to have a larger thickness, thus restraining an increase in temperature of the tapered roller bearing 1 even when the contact surface pressure increases to some extent.

According to the embodiment, as illustrated in FIG. 3, the contact ellipse S formed by contact between the large end face 4b of the tapered roller 4 and the rib face 7b of the inner ring 2 is located radially inward from the radially outer edge 31 of the rib face 7b. This prevents the contact surface pressure from being increased by edge load locally on the large end face 4b of the tapered roller 4. It is preferable that the dimension b of the contact ellipse S that is set to a constant value in FIG. 4 be slightly smaller than the radial dimension of the rib face 7b (i.e., the dimension between the radially outer edge 31 and the radially inner edge 32). The position of the contact ellipse S (the position of the center C1) on the rib face 7b is set by adjusting the positions of the point P, the point Q, and the cone center C1. According to the embodiment, as illustrated in FIG. 3, the point P, the point Q, and the cone center C0 all lie on a common line L1 in cross section including a center line L0 of the tapered roller bearing 1. Alternatively, the point P, the point Q, and the cone center C0 may not lie on the common line L1.

FIG. 1 illustrates the differential device 51 including the tapered roller bearings 1 having the structure described above. The differential device 51 includes the housing 55, the pinion shaft (a power transmission shaft) 52, and a pair of bearings. The pinion shaft 52 is located in the housing 55. The bearings rotatably support the pinion shaft 52. The bearings are the tapered roller bearings 1. According to the differential device 51, as already described (refer to FIG. 2), the tapered roller bearings 1 that support the pinion shaft 52 allow a reduction in the contact surface pressure exerted between the large rib 7 (the rib face 7b) of the inner ring 2 and the tapered roller 4 (the large end face 4b) while allowing an increase in the thickness of the oil film formed between the large rib 7 and the tapered roller 4. This reduces the rotational resistance of the pinion shaft 52, thus improving rotational performance.

The embodiment disclosed above is to be considered in all respects as illustrative and not restrictive. The tapered roller bearing according to the invention is not limited to the structure illustrated in the drawings, and various modifications are possible within the scope of the invention. For example, the cage 10 may have a structure different from the illustrated structure. Although the embodiment illustrates that the tapered roller bearing 1 is used in a differential device, the tapered roller bearing 1 can be used in any other power transmission device including a transmission device. Further, the tapered roller bearing 1 may be used in a rotating machine instead of a power transmission device.

The invention allows a reduction in a contact surface pressure exerted between a large rib of an inner ring and a tapered roller while allowing an increase in the thickness of an oil film formed between the large rib and the tapered roller. Thus, during rotation of a tapered roller bearing, a sliding frictional resistance between the large rib and the tapered roller is reduced accordingly.

What is claimed is:

1. A tapered roller bearing comprising:
an inner ring having an outer circumferential surface provided with an inner raceway, the inner ring having a large rib projecting radially outward from an axial end of the inner raceway;
an outer ring having an inner circumferential surface provided with an outer raceway;
a plurality of tapered rollers in rolling contact with the inner raceway and the outer raceway; and
an annular case that holds the tapered rollers, wherein
each of the plurality of tapered rollers has, at its axial end, a large end face that is a convex surface,
the large rib has a rib face that is a concave surface and that is in contact with the large end face, and
when a distance from a position of contact between the large end face and the rib face to a cone center of a corresponding one of the plurality of tapered rollers is defined as R, a curvature radius of the large end face is defined as Rr, and a curvature radius of the rib face is defined as Ri, an inequality represented by 2≤(Ri−R)/(R−Rr)≤10 is satisfied, where Rr<R<Ri.

2. The tapered roller bearing according to claim 1, wherein
a contact ellipse formed by contact between the large end face and the rib face is located radially inward from a radially outer edge of the rib face.

3. A power transmission device comprising:
a housing:
a power transmission shaft located in the housing; and
a pair of bearings that rotatably support the power transmission shaft, wherein the bearings are the tapered roller bearings of claim 1.

4. A power transmission device comprising:
a housing:
a power transmission shaft located in the housing; and
a pair of bearings that rotatably support the power transmission shaft, wherein the bearings are the tapered roller bearings of claim 2.

* * * * *